United States Patent
Lee et al.

(10) Patent No.: US 6,862,400 B1
(45) Date of Patent: Mar. 1, 2005

(54) APPARATUS AND METHOD FOR CONTROLLING COPY OF VIDEO SIGNAL

(75) Inventors: Chang-rok Lee, Seoul (KR); Chul-min Kim, Suwon (KR)

(73) Assignee: Samsung Electronics Co., LTD, Suwon-si (KR)

( * ) Notice: Subject to any disclaimer, the term of this patent is extended or adjusted under 35 U.S.C. 154(b) by 953 days.

(21) Appl. No.: 09/580,434

(22) Filed: May 30, 2000

(30) Foreign Application Priority Data

May 31, 1999 (KR) ........................................ 1999-19771

(51) Int. Cl.⁷ ............................. H04N 5/91; G11B 5/86
(52) U.S. Cl. ......................................... 386/94; 360/15
(58) Field of Search ............................. 386/94, 95, 46, 386/124, 92, 52, 55, 1, 4; 360/13, 15, 60; 380/201, 203; 725/25, 30, 31; H04N 5/91; G11B 5/86

(56) References Cited

U.S. PATENT DOCUMENTS

| | | | | |
|---|---|---|---|---|
| 5,177,618 A | * | 1/1993 | Dunlap et al. ................. | 386/94 |
| 5,627,655 A | * | 5/1997 | Okamoto et al. ............. | 386/94 |
| 5,991,500 A | * | 11/1999 | Kanota et al. ................. | 386/94 |
| 6,442,332 B1 | * | 8/2002 | Knudson et al. ............... | 386/83 |

FOREIGN PATENT DOCUMENTS

KR    1998-052601    9/1998

OTHER PUBLICATIONS

Notice to Submit Response issued by the Korean Industrial Property Office dated Apr. 30, 2001 and its English translation.

* cited by examiner

Primary Examiner—Robert Chevalier
(74) Attorney, Agent, or Firm—Robert E. Bushnell, Esq.

(57) ABSTRACT

An apparatus and method for controlling copying of a video signal are provided for detecting a copy preventing signal, and for stopping recording and informing the user that a video signal to be recorded is protected against copying when a video signal having a copy-preventing signal is detected. In the apparatus and method, a copying (or recording) mode is stopped, and the user is informed that a recording medium to be copied is protected against illegal copying when a copy-preventing signal is detected from a video signal reproduced from the recording medium to be copied, thereby allowing the user to quickly recognize that the recording medium to be copied includes a copy-preventing signal before completing the copying. In addition, when the apparatus and method are applied to a dual deck VCR, FM copying can be controlled depending on whether a macrovision signal exists on the basis of the beginning date on which the aggressive protection of copyright becomes effective.

12 Claims, 5 Drawing Sheets

FIRST FIELD

SECOND FIELD

APPARATUS AND METHOD FOR CONTROLLING COPY OF VIDEO SIGNAL

CLAIM OF PRIORITY

This application makes reference to, incorporates the same herein, and claims all benefits accruing under 35 U.S.C. § 119 from my application APPARATUS AND METHOD FOR CONTROLLING COPY OF VIDEO SIGNAL filed with the Korean Industrial Property Office on 31 May 1999 and there duly assigned Serial No. 19771/1999.

BACKGROUND OF THE INVENTION

1. Field of the Invention

The present invention relates to a video signal recording/reproducing apparatus and method, and more particularly to an apparatus and method for controlling copying of a video signal when the material ("content") embodied in the signal is copy-protected.

2. Description of the Related Art

To protect copyrights, generally, a video cassette recorder (VCR), which is a video recording/reproducing apparatus, embeds a macrovision signal. This is an automatic gain control (AGC) pulse in an interval between the $12^{th}$ and the $19^{th}$ horizontal synchronizing signals of the first field of a composite synchronizing signal and in an interval between the $275^{th}$ and the $282^{nd}$ horizontal synchronizing signals of the second field of the composite synchronizing signal.

According to conventional technology, when a video signal including such a macrovision signal is recorded, AGC is performed during the video recording signal processing. Thus, the video level is automatically adjusted on the basis of the macrovision signal during recording, so that the level of the video signal is greatly reduced. Accordingly, when reproducing a recorded video signal having a macrovision signal, the level of the video signal is very low in an interval in which the macro vision signal is recorded. That causes it to be difficult to recognize an image. In this manner, illegal copying of protected content of video tapes has been prevented.

As described above, the conventional technology has the disadvantage that it cannot be known that a tape to be copied is copy-protected until the tape is attempted to be copied in a normal recording mode, and then the copied tape is reproduced. In addition, in the case of FM copying by a dual deck VCR, normal copy is achieved. Consequently, infringement of copyrights can occur, because a macrovision signal cannot be detected with conventional technology in the FM copy mode.

SUMMARY OF THE INVENTION

To solve the above problem, an object of the present invention is to provide an apparatus and method for controlling the copying of a video signal so as to detect whether a recording medium to be copied includes a copy preventing signal (a macrovision signal). Related objects of the invention include preventing illegal copying by not performing in a recording mode when the recording medium includes a copy-preventing signal, and informing a user of such facts.

To achieve the above objects, the present invention provides an apparatus for controlling copying according to the standard of a video signal to be recorded. The apparatus includes; a video signal processor for separating a composite synchronizing signal from the input video signal to be recorded, and for modulating or demodulating the video signal; a detector for receiving the composite synchronizing signal and detecting a copy preventing signal; and a controller for generating a recording prevention control signal to stop a recording mode when a copy-preventing signal is detected by the detector.

The present invention also provides a method for controlling copying according to the standard of a video signal to be recorded. The method includes the steps of: (a) determining whether a copy command is input; (b) comparing a time $T_1$ read from a timer with a threshold value $T_0$ set an initial stage when it is determined that the copy command is input in the step (a): (c) determining whether a copy-preventing signal is detected from the video signal to be recorded when it is determined that $T_1 \geq T_0$ in step (b); and (d) stopping a copy mode when it is determined that a copy-preventing signal is detected from the video signal in step (c).

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
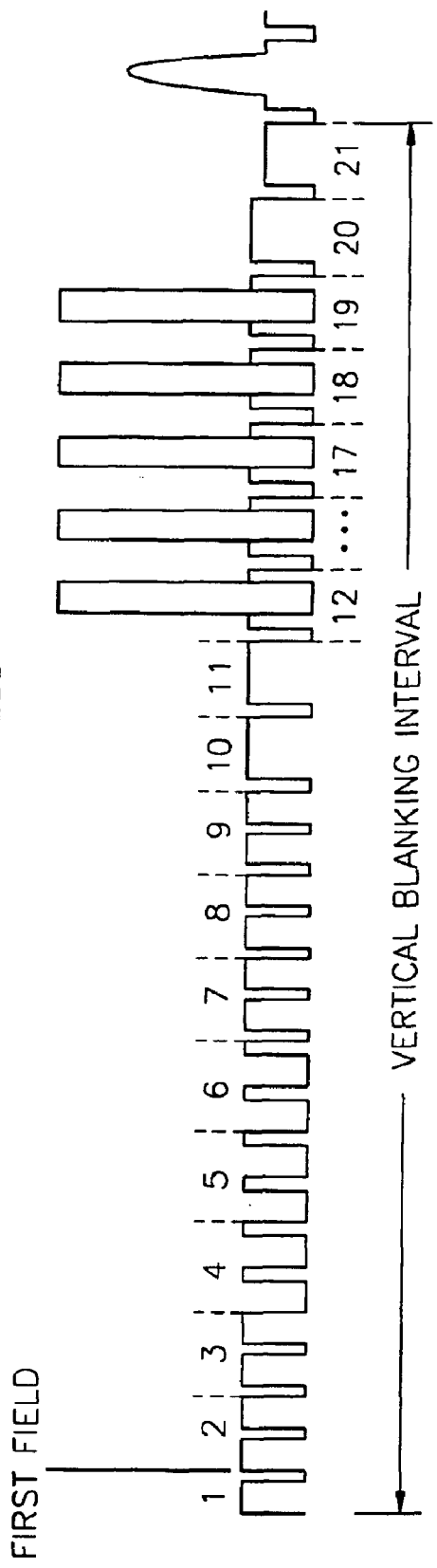
FIGS. 1A and 1B illustrate macrovision signals added to a video signal.
Figure 1B:
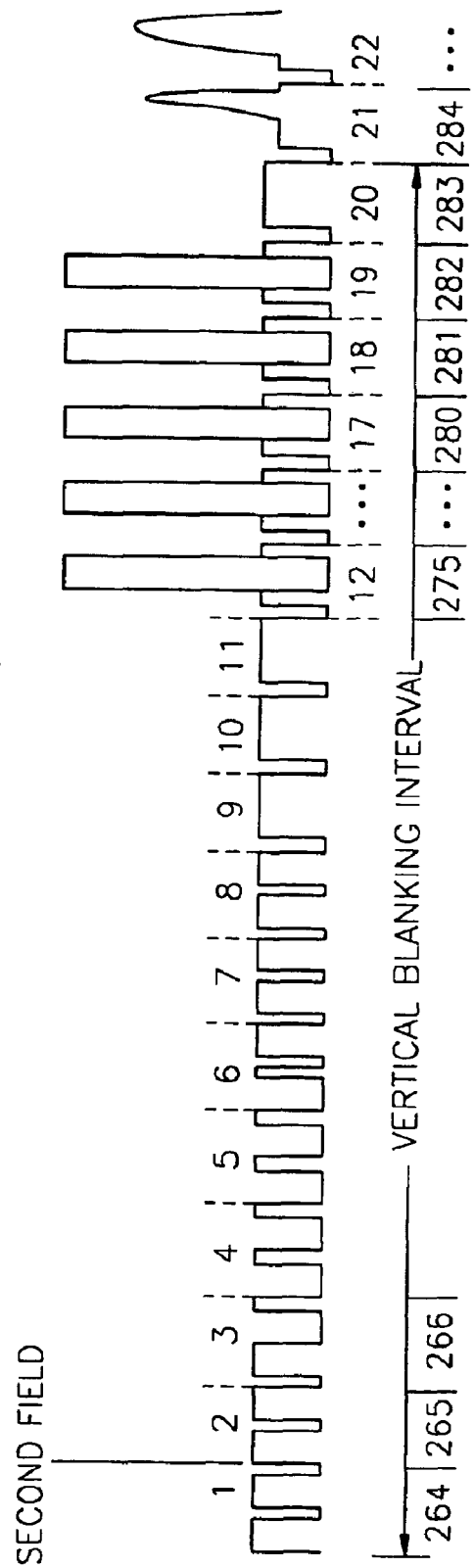

FIGS. 1A and 1B illustrate macrovision signals added to a video signal. As mentioned above, to protect copyrights, generally, a video cassette recorder (VCR), which is a video recording/reproducing apparatus, embeds a macrovision signal. This is an automatic gain control (AGC) pulse in an interval between the $12^{th}$ and the $19^{th}$ horizontal synchronizing signals of the first field of a composite synchronizing signal and in an interval between the $275^{th}$ and the $282^{nd}$ horizontal synchronizing signals of the second field of the composite synchronizing signal, as shown in FIGS. 1A and 1B.

Figure 2:
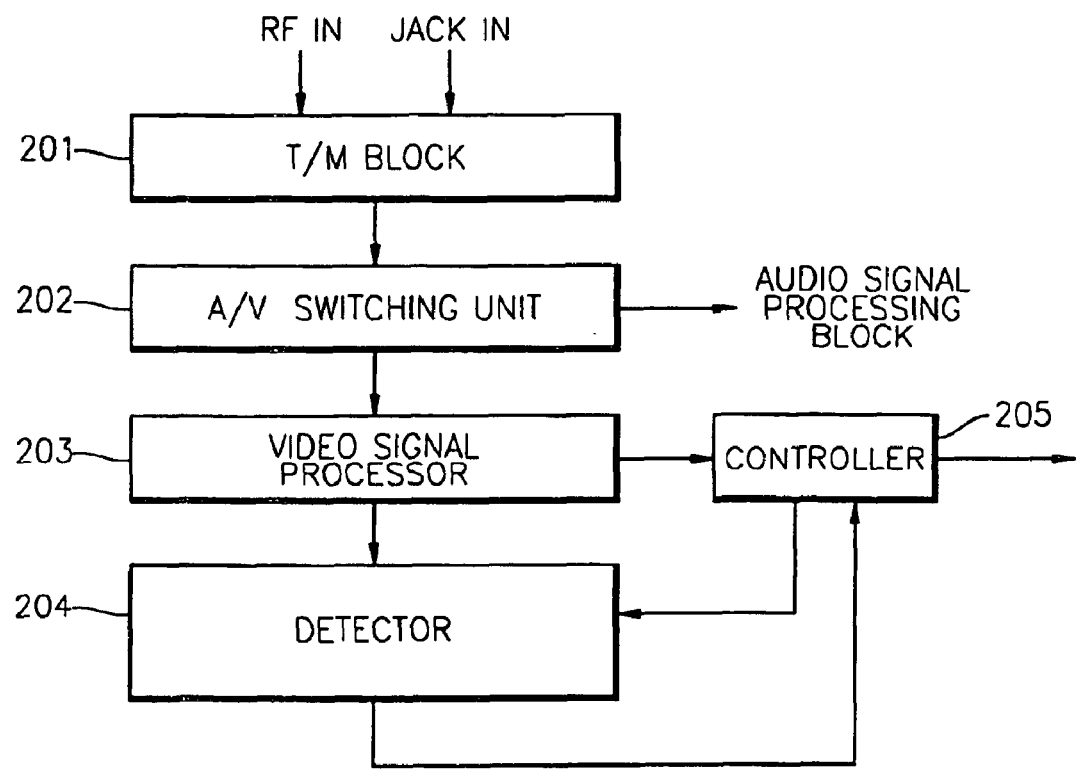
FIG. 2 is a diagram illustrating the configuration of an apparatus for controlling copying of a video signal according to the present invention.

Referring to FIG. 2, an apparatus for controlling copying of a video signal includes tuner/modulator (T/M) block 201, audio/video (A/V) switching unit 202, video signal processor 203, detector 204, and controller 205.

T/M block 201 separately outputs the video signal and the audio signal of a channel which is selected by a user from broadcast signals input through an RF input terminal or outputs a signal input from a video/audio jack input terminal directly through a line.

A/V switching unit 202 separately outputs the video signal and the audio signal input from T/M block 201 to corresponding signal processing blocks. In other words, the video signal is output to video signal processor 203, and the audio signal is output to an audio signal processing block (not shown).

In a recording mode, video signal processor 203 separates the input video signal into a luminance signal and a color signal, and frequency-modulates and low-band-frequency converts the luminance and color signals. In a reproducing mode, video signal processor 203 separates a modulated input video signal into a luminance signal and a color signal, and demodulates the luminance and color signals. Video signal processor 203 also separates a vertical/horizontal synchronizing signal from an input video signal and outputs it as a composite synchronizing signal.

Detector 204 receives the composite synchronizing signal and detects and outputs a macrovision signal which is a copy-preventing signal. Detector 204 thus acts as a means for receiving the composite synchronizing signal and detecting a copy-preventing signal.

Controller 205 counts the horizontal synchronizing signals of the composite synchronizing signal to generate a masking pulse for slicing an interval between the $12^{th}$ and the $19^{th}$ horizontal synchronizing signals of a first field and an interval between the $275^{th}$ and the $282^{nd}$ horizontal synchronizing signals of a second field, on which the macrovision signal is loaded. When the controller 205 receives information that a macrovision signal is detected from the detector 204, it generates a recording prevention control signal for stopping a recording mode and, simultaneously, generates a display control signal for displaying an on-screen display message that a tape to be copied is a recording medium protected against illegal copy. A pulse generator unit for generating a masking pulse which is generated by controller 205 above may be included in detector 204. Controller 205 thus acts as a means for generating a recording-prevention control signal adapted to stop a recording of the content embodied in the video signal when the copy preventing signal is detected by the detector 204.

Figure 3:
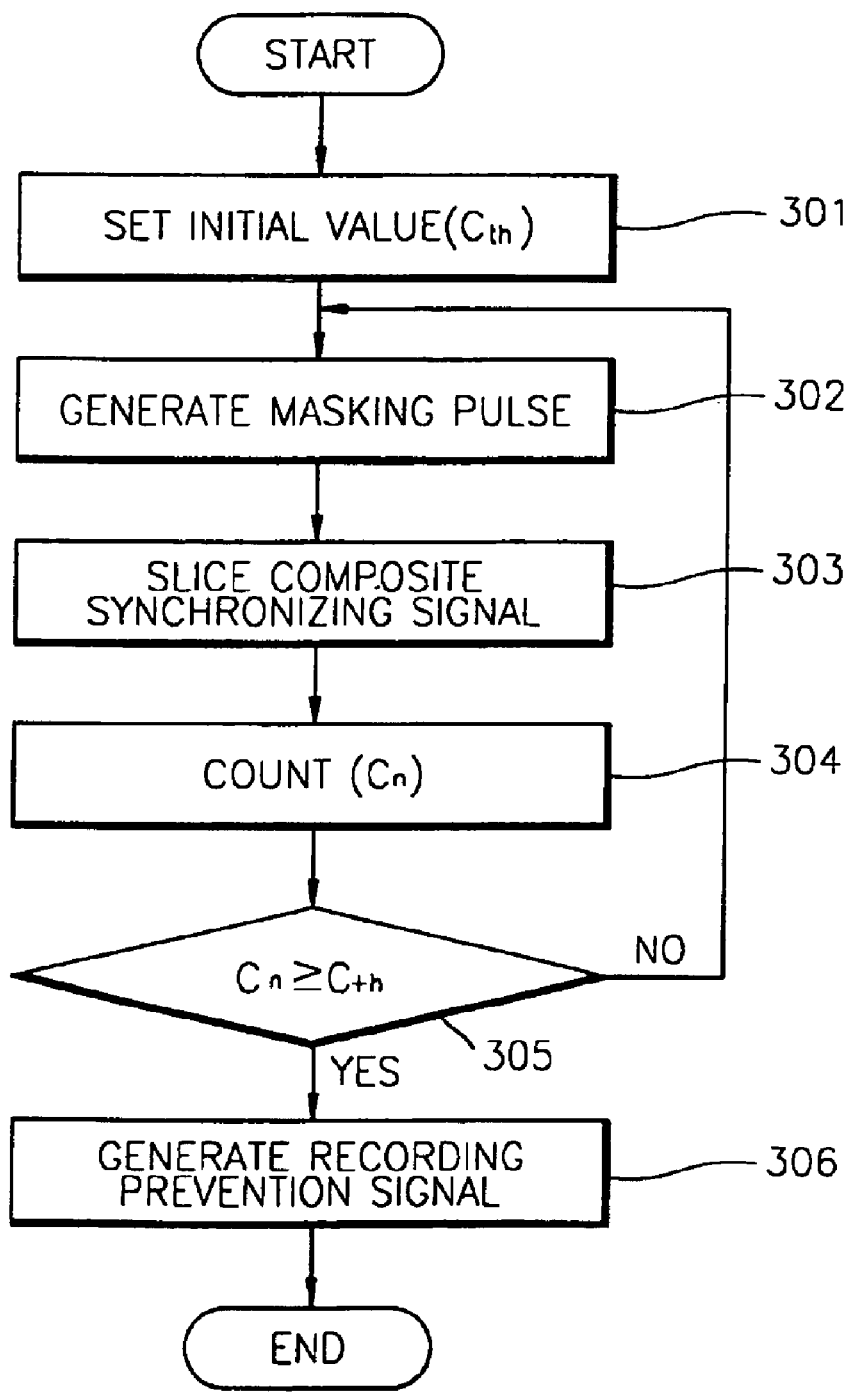
FIG. 3 is a flowchart of a determination method performed by the detector of FIG. 2.

A method for controlling copying of a video signal using controller 205 when detector 204 determines that a macrovision signal is included in a video signal is described in detail with reference to FIG. 3. A predetermined threshold value $C_{th}$ for determining whether or not a macrovision signal is included in an interval in which a masking pulse is generated is set and stored in a nonvolatile memory (a memory within the detector 204) in step 301. In other words, the threshold $C_{th}$ is set to exceed the number of horizontal synchronizing signals and to be smaller than or equal to the sum of the number of the horizontal synchronizing signals and the number of macrovision signals in an interval in which a masking pulse is generated.

In step 302, the horizontal synchronizing signals of a composite synchronizing signal are counted to generate a masking pulse for slicing an interval between the $12^{th}$ and the $19^{th}$ horizontal synchronizing signals of a first field and an interval between the $275^{th}$ and the $282^{nd}$ horizontal synchronizing signals of a second field, on which the macrovision signal is loaded.

In step 303, the input composite synchronizing signal is sliced using the masking pulse generated in step 302. In other words, only the composite synchronizing signal in the interval in which the masking pulse is generated is output.

In step 304, the horizontal synchronizing signals and the macrovision signals included in the composite synchronizing signal sliced by the masking pulse are counted to obtain count value $C_n$. When the macrovision signals are not loaded, only the horizontal synchronizing signals included in the composite synchronizing signal are counted.

In step 305, count value $C_n$ is compared with threshold value $C_{th}$ initially set in the step 301.

In step 306, if $C_n \geq C_{th}$, it is determined that the macrovision signal is included, and a recording prevention signal is generated to stop the recording mode. Additionally, an on-screen display message indicating that the recording medium to be copied is protected from copy is displayed.

The copyright material can be passively protected from illegal copying by adding a macrovision signal to a video signal as described above. However, dual deck VCRs on the market allow even a video signal including a macrovision signal to be normally copied using an FM copy method (which directly records a modulated video signal read from a recording medium to be copied without demodulating the video signal). To prevent illegal copying of a recording medium containing macrovision signals, for example, in the United States, copyrights will be aggressively protected from Apr. 28, 2000.

Figure 4:
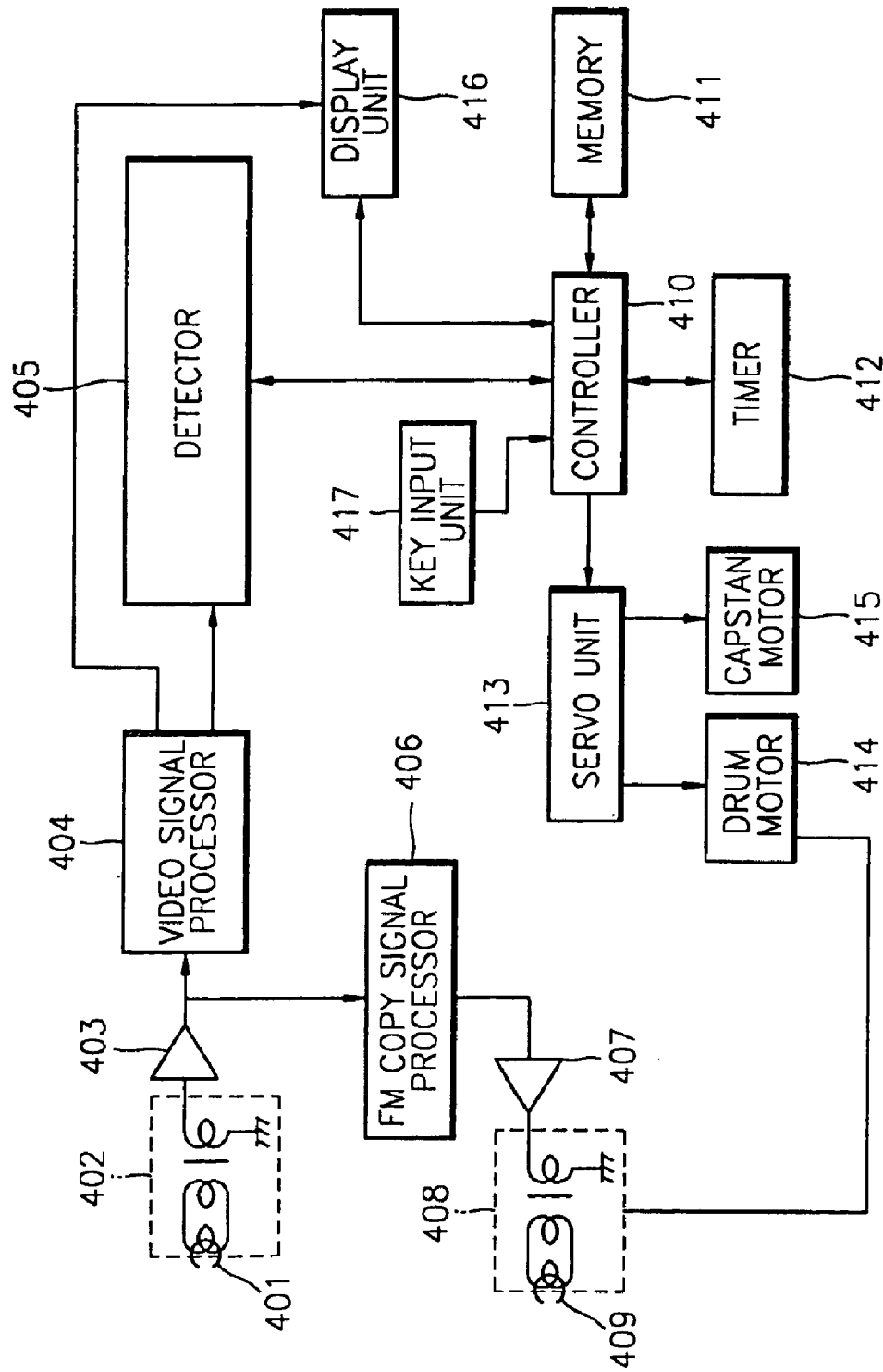
FIG. 4 is a diagram illustrating the configuration of a dual deck video cassette recorder (VCR) to which the present invention is applied.

The following description concerns an embodiment of the invention in an apparatus and method for controlling copying by applying a method of detecting a copy preventing signal to a dual deck VCR according to the present invention. Referring to FIG. 4, the dual deck VCR to which the present invention is applied includes video heads 401 and 409, rotary transformers 402 and 408, pre-amplifier 403, video signal processor 404, detector 405, FM copy signal processor 406, recording amplifier 407, controller 410, memory 411, timer 412, servo unit 413, drum motor 414, capstan motor 415, display unit 416 and key input unit 417.

Video head 401, rotary transformer 402, video signal processor 404 and detector 405 are included in a reproducing deck VCR, and video head 409, rotary transformer 408, recording amplifier 407, servo unit 413, drum motor 414 and capstan motor 415 are included in a recording deck VCR. Controller 410, memory 411, timer 412, display unit 416 and key input unit 417 are commonly used by the reproducing and recording deck VCRs.

In a normal copy mode, primarily, a recording medium from which material is to be reproduced is loaded on the reproducing deck VCR and a recording medium on which the material is to be recorded is loaded in the recording deck VCR. Next, once a user enters a copy command using key buttons in key input unit 417, controller 410 analyzes the input key command and controls the peripheral units such that the reproducing deck VCR performs reproduction and the recording deck VCR performs recording.

More specifically, in video signal processing by the reproducing deck VCR, a video signal detected by the video head 401 is transmitted to pre-amplifier 403 via rotary transformer 402. Pre-amplifier 403 amplifies the input video signal according to a predetermined gain value suitable for signal processing.

The video signal amplified by pre-amplifier 403 undergoes signal processing such as demodulation, noise filtering and de-emphasis in signal processor 404. Signal processor 404 outputs the signal processed video signal to display unit 416. Simultaneously, FM copy signal processor 406 performs signal processing such as automatic gain control (AGC), limiting signal level and frequency characteristic compensation on the modulated video signal input from the pre-amplifier 403 without demodulation of the modulated video signal., Next, the output signal of FM signal processor 406 is applied to and amplified by recording amplifier 407 of the recording deck VCR, and is then transmitted to video head 409 via rotary transformer 408 so as to be recorded on the recording medium in the recording deck VCR.

Figure 5:
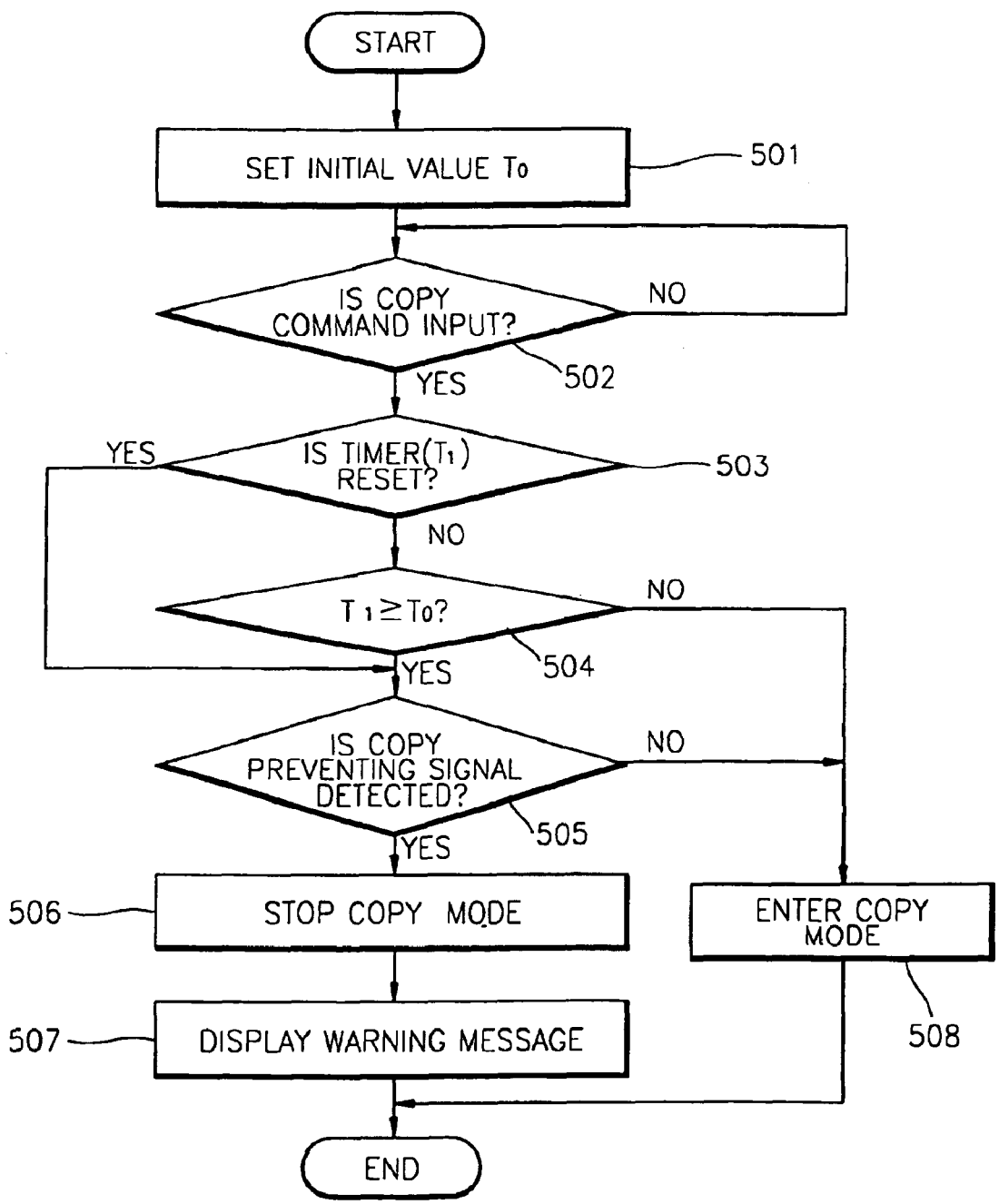
FIG. 5 is a flowchart of a method for controlling copying in a dual deck VCR according to the present invention.

A method and apparatus for controlling copying in a dual deck VCR on the basis of a beginning data at which copyright is aggressively protected will be described with reference to FIGS. 4 and 5.

In step 501, initial value $T_0$ is set by storing data on the beginning date at which copyright is aggressively protected in nonvolatile memory 411.

In step 502, it is determined whether a copy command is input to controller 410 through key input unit 417.

Instep 503, controller 411 determines whether timer 412 is reset or not. The capacity of the battery of timer 412 is set such that timer 412 can backup the dates from a current date at least to the date the aggressive protection of copyright becomes effective. Accordingly, in the case in which a set including timer 412 is not sold and not used on the last date on which timer 412 can be backed up, timer 412 is reset after the date. Therefore, when timer 412 is reset, it is determined that the aggressive protection of copyright is currently valid.

In step 504, when it is determined that timer 412 is not reset in step 503, controller 410 compares data $T_1$ on the date and year read from timer 412 with data $T_0$ on the beginning date of aggressive protection of copyright set in step 501.

When $T_1 \geq T_0$, or when it is determined that timer 412 is reset, it is determined that the aggressive protection of copyright is currently valid. Accordingly, detector 405 determines whether a macrovision signal which is a copy preventing signal is detected in step 505.

In step 506, when the macrovision signal is detected in step 505, controller 410 controls the peripheral units so as to stop a copy mode. In other words, controller 410 outputs a control signal to servo unit 413 to perform a stop mode. Then, servo unit 413 generates and outputs a driving voltage corresponding to the stop mode to drum motor 414 and capstan motor 415 to convert an operation mode from the copy mode into the stop mode.

In step 507, when the copy mode is stopped, characters informing the user that a recording medium to be copied is protected from being illegally copied are displayed through an on-screen display message. In other words, controller 410 controls character signals stored in the memory 411 to be read to display a message informing the user that the recording medium is protected from illegal copying through display unit 416.

When $T_1 \geq T_0$, or when the macrovision signal is not detected in step 505, a normal copy mode is performed in step 508.

Accordingly, the dual deck VCR performs copying regardless of detection of the macrovision signal before the aggressive protection of copyright becomes effective, and stops copy when the macrovision signal is detected after the aggressive protection of in copyright becomes effective.

As described above, the present invention stops a copy (or recording) mode and informs a user that a recording medium to be copied is protected from copying when a copy preventing signal is detected from a video signal reproduced from the recording medium to be copied, thereby allowing the user to quickly recognize that the recording medium to be copied includes a copy preventing signal before completing the copy. In addition, when the present invention is applied to a dual deck VCR, the FM copy can be controlled depending on the existence/non-existence of a macrovision signal on the basis of the beginning date on which the aggressive protection of copyright becomes effective, thereby providing convenience to the user and allowing for manufacture of productions without violating copyright laws.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. In an apparatus for controlling copying of content embodied in an input video signal to be recorded, the apparatus comprising a video signal processor for separating a composite synchronizing signal from the input video signal, and for performing at least one of modulating and demodulating the input video signal, the improvement comprising:

first means for receiving the composite synchronizing signal and for detecting therefrom a copy-preventing signal; and second means for generating a recording-prevention control signal to stop a recording of the content contained in the input video signal when the copy-preventing signal is detected by the first means;

wherein the first means comprises:

a pulse generator for generating a masking pulse in a predetermined interval of the composite synchronizing signal in which the copy-preventing signal is contained;

a first gate for providing as an output signal the composite synchronizing signal in the predetermined interval in which the masking pulse is generated;

an integrator for integrating the output signal from the first gate and for providing as an output an integrated signal, said integrated signal having an output level; and a comparator for comparing the output level of the integrated signal with a predetermined threshold value to determine whether the copy-preventing signal is detected.

2. In the apparatus of claim 1, wherein the first means includes a second gate for removing a horizontal synchronizing signal from the composite synchronizing signal in the predetermined interval in which the masking pulse is generated.

3. In an apparatus for controlling copying of content embodied in an input video signal to be recorded, the apparatus comprising a video signal processor for separating a composite synchronizing signal from the input video signal, and for performing at least one of modulating and demodulating the input video signal, the improvement comprising:

first means for receiving the composite synchronizing signal and for detecting therefrom a copy-preventing signal; and second means for generating a recording-prevention control signal to stop a recording of the content contained in the input video signal when the copy-preventing signal is detected by the first means;

wherein the first means comprises a detector for indicating detection of the copy-preventing signal when a pulse count value in a predetermined interval of the composite synchronizing signal is not less than a predetermined threshold value, said predetermined threshold value being not less than a sum of horizontal synchronizing signals and macrovision signals.

4. In the apparatus of claim 1, wherein the second means comprises a display unit for displaying information indicating that the content contained in the input video signal is copy-protected when the copy-preventing signal is detected by the first means.

5. In a method for controlling copying of content embodied in an input video signal to be recorded, the method comprising the steps of separating a composite synchronizing signal from the input video signal, and performing at least one of modulating and demodulating the input video signal, the improvement comprising the further steps of:

(1) determining whether a copy command has been input;

(2) comparing a time $T_1$ read from a timer with an initially set threshold value $T_0$ when it is determined in step (1) that the copy command has been input;

(3) determining whether a copy-preventing signal is present in the input video signal when it is determined in step (2) that $T_1 \geq T_0$; and (4) refraining from copying the content embodied in the input video signal when it is determined in step (3) that the copy-preventing signal is present in the input video signal.

6. In the method of claim 5, wherein step (4) further comprises displaying information indicating that the content embodied in the input video signal is copy-protected.

7. In the method of claim 5, wherein the threshold value $T_0$ is set to a date on which aggressive protection of copyright becomes effective.

8. In an apparatus for controlling copying of content embodied in a video signal, said apparatus comprising a dual deck video cassette recorder (VCR) having a reproducing deck VCR, a recording deck VCR, an FM copy signal processor for performing automatic gain control and waveform equalization without demodulating a video signal detected by a video head of the reproducing deck VCR, and a video signal processor for demodulating the video signal detected by the video head of the reproducing deck VCR and for separating a composite synchronizing signal from the demodulated video signal;

the improvement comprising first means for receiving the composite synchronizing signal, and for detecting therefrom whether the composite synchronizing signal contains a copy-preventing signal;

second means for generating a recording-prevention control signal when the first means detects that the composite synchronizing signal contains the copy-preventing signal; and third means for receiving the recording-prevention control signal and responsive thereto for causing the recording deck VCR not to record the content embodied in the video signal;

wherein the second means generates the recording-prevention control signal only after a date on which aggressive protection of copyright becomes effective.

9. In the apparatus of claim 8, wherein the second means comprises a display unit for displaying information indicating that the copy-preventing signal has been detected when the copy-preventing signal is detected.

10. In a process for manufacturing an apparatus for controlling copying of content embodied in an input video signal to be recorded, the apparatus comprising a video signal processor for separating a composite synchronizing signal from the input video signal, and for performing at least one of modulating and demodulating the input video signal, said process comprising the steps of:

(1) providing first means for receiving the composite synchronizing signal and for detecting therefrom a copy-preventing signal; and (2) providing second means for generating a recording-prevention control signal adapted to stop a recording of the content embodied in the input video signal when the copy-preventing signal is detected by the first means;

wherein the first means comprises a detector for indicating detection of the copy-preventing signal when a pulse count value in a predetermined interval of the composite synchronizing signal is not less than a predetermined threshold value, said predetermined threshold value being not less than a sum of horizontal synchronizing signals and macrovision signals.

11. In a process for manufacturing an apparatus for controlling copying of content embodied in a video signal, said apparatus comprising a dual deck video cassette recorder (VCR) having a reproducing deck VCR, a recording deck VCR, an FM copy signal processor for performing automatic gain control and waveform equalization without demodulating a video signal detected by a video head of the reproducing deck VCR, and a video signal processor for demodulating the video signal detected by the video head of the reproducing deck VCR and for separating a composite synchronizing signal from the demodulated video signal; said process comprising the steps of:

(1) providing first means for receiving the composite synchronizing signal and for detecting therefrom whether the composite synchronizing signal contains a copy-preventing signal;

(2) providing second means for generating a recording-prevention control signal when the first means detects that the composite synchronizing signal contains the copy-preventing signal; and (3) providing third means for receiving the recording-prevention control signal and responsive thereto for causing the recording deck VCR not to record the content embodied in the video signal;

wherein the second means generates the recording-prevention control signal only after a date on which aggressive protection of copyright becomes effective.

12. In a process for manufacturing an apparatus for controlling copying of content embodied in an input video signal to be recorded, the apparatus comprising a video signal processor for separating a composite synchronizing signal from the input video signal, and for performing at least one of modulating and demodulating the input video signal, said process comprising the steps of:

(1) providing first means for receiving the composite synchronizing signal and for detecting therefrom a copy-preventing signal; and (2) providing second means for generating a recording-prevention control signal adapted to stop a recording of the content embodied in the input video signal when the copy-preventing signal is detected by the first means;

wherein the first means comprises:

a pulse generator for generating a masking pulse in a predetermined interval of the composite synchronizing signal in which the copy-preventing signal is contained;

a first gate for providing as an output signal the composite synchronizing signal in the predetermined interval in which the masking pulse is generated;

an integrator for integrating the output signal from the first gate and for providing as an output an integrated signal, said integrated signal having an output level; and a comparator for comparing the output level of the integrated signal with a predetermined threshold value to determine whether the copy-preventing signal is detected.

* * * * *